United States Patent
Zhao et al.

(10) Patent No.: US 9,929,919 B2
(45) Date of Patent: Mar. 27, 2018

(54) SYSTEM AND METHOD FOR VIRTUAL NETWORK ABSTRACTION AND SWITCHING

(71) Applicant: FutureWei Technologies, Inc., Plano, TX (US)

(72) Inventors: Qianglin Quintin Zhao, Boxborough, MA (US); Renwei Li, Fremont, CA (US); Lin Han, San Jose, CA (US); Katherine Zhao, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 392 days.

(21) Appl. No.: 14/067,704

(22) Filed: Oct. 30, 2013

(65) Prior Publication Data

US 2014/0122683 A1    May 1, 2014

Related U.S. Application Data

(60) Provisional application No. 61/720,300, filed on Oct. 30, 2012.

(51) Int. Cl.
*H04L 12/24* (2006.01)
*H04L 12/715* (2013.01)
(Continued)

(52) U.S. Cl.
CPC .......... *H04L 41/5054* (2013.01); *H04L 41/12* (2013.01); *H04L 45/64* (2013.01); *H04L 45/02* (2013.01); *H04L 45/42* (2013.01)

(58) Field of Classification Search
CPC . H04L 12/4641; H04L 45/02; H04L 12/4675; H04L 47/829
(Continued)

(56) References Cited

U.S. PATENT DOCUMENTS

| | | | |
|---|---|---|---|
| 7,197,553 B2* | 3/2007 | Roberts | H04L 41/12 709/218 |
| 2004/0193729 A1* | 9/2004 | Saraph | H04L 45/12 709/241 |

(Continued)

OTHER PUBLICATIONS

Rosen, E., et al., "BGP/MPLS VPNs," RFC 2547, Mar. 1999, 24 pages.
(Continued)

*Primary Examiner* — Moustafa M Meky
*Assistant Examiner* — Elizabeth Kassa
(74) *Attorney, Agent, or Firm* — Slater Matsil, LLP (57) ABSTRACT

Embodiments are provided herein to enable single level network abstraction for a service across one or more domains. The embodiments use a single network ID to identify a service and a corresponding virtual network topology across any number of domains at a physical network. A virtual network topology can be abstracted for each service, based on the physical underlying network topology. A network controller determines, for a service, the virtual network topology within a physical network, and binds the service to the virtual network topology via a virtual network ID, which defines a single forwarding domain of the virtual network topology across the physical network. The virtual network ID is then indicated to the nodes of the virtual network topology, thus enabling the nodes to identify and forward traffic for the service, within the single forwarding domain, between end clients from edge to edge of the physical network.

26 Claims, 9 Drawing Sheets

(51) Int. Cl.
  *H04L 12/751* (2013.01)
  *H04L 12/717* (2013.01)
(58) Field of Classification Search
  USPC .......................................................... 709/223
  See application file for complete search history.

(56) References Cited

U.S. PATENT DOCUMENTS

| | | | | |
|---|---|---|---|---|
| 2007/0180104 A1* | 8/2007 | Filsfils | .................... | H04L 45/02 709/224 |
| 2007/0242667 A1* | 10/2007 | Liu | .................... | H04L 45/04 370/389 |
| 2008/0095160 A1* | 4/2008 | Yadav | .................. | H04L 12/1886 370/390 |
| 2008/0310421 A1* | 12/2008 | Teisberg | .............. | H04L 12/4641 370/395.53 |
| 2009/0129385 A1* | 5/2009 | Wray | .................. | H04L 12/4633 370/392 |
| 2009/0168666 A1* | 7/2009 | Unbehagen | ......... | H04L 12/4662 370/254 |
| 2009/0201937 A1* | 8/2009 | Bragg et al. | .................... | 370/401 |
| 2010/0046531 A1* | 2/2010 | Louati | .................. | H04L 41/0806 370/401 |
| 2011/0176412 A1* | 7/2011 | Stine | .................... | H04L 41/0668 370/221 |
| 2011/0264806 A1* | 10/2011 | Tuck | ................. | H04L 29/12066 709/226 |
| 2011/0295942 A1* | 12/2011 | Raghunath et al. | .......... | 709/203 |
| 2012/0044950 A1* | 2/2012 | Pushparaj | ........... | H04L 12/4641 370/401 |
| 2012/0195318 A1* | 8/2012 | Numata et al. | ................ | 370/392 |
| 2013/0290955 A1* | 10/2013 | Turner | .................... | H04L 41/12 718/1 |
| 2013/0322453 A1* | 12/2013 | Allan | ........................ | 370/395.53 |
| 2013/0325934 A1* | 12/2013 | Fausak | ................ | H04L 29/0809 709/203 |
| 2014/0098673 A1* | 4/2014 | Lee et al. | ....................... | 370/238 |

OTHER PUBLICATIONS

Psenak, P., et al., "Multi-Topology (MT) Routing in OSPF," RFC 4915, Jun. 2007, 21 pages.
Przygienda, T., et al., "M-ISIS: Multi Topology (MT) Routing in Intermediate System to Intermediate Systems (IS-ISs)," RFC 5120, Feb. 2008, 15 pages.
Zhao, Q., et al., "LDP Extensions for Multi Topology Routing draft-ietf-mpls-ldp-multi-topology-08.txt," Updates 4379, May 13, 2013, 19 pages.

* cited by examiner

SYSTEM AND METHOD FOR VIRTUAL NETWORK ABSTRACTION AND SWITCHING

This application claims the benefit of U.S. Provisional Application No. 61/720,300 filed on Oct. 30, 2012 by Qianglin Quintin Zhao et al. and entitled "System and Method for SDN Virtual Network Abstraction and Switching," which is hereby incorporated herein by reference as if reproduced in its entirety.

TECHNICAL FIELD

The present invention relates to the field of network communications, and, in particular embodiments, to a system and method for virtual network abstraction and switching.

BACKGROUND

In current networks, Multi-Protocol Label Switching (MPLS) Virtual Private Network (VPN) virtual routing and forwarding (VRF) is used to distinguish different MPLS virtual networks, where each virtual network is assigned a VPN ID. Further, an Interior Gateway Protocol (IGP) topology ID is used for indicating an IGP domain within which virtual network traffic is forwarded. A MPLS Multiple Topology (MT) ID is also designed for indicating a MPLS domain for forwarding the traffic. As such, the virtual network IDs for a service virtual network can be represented by three levels of virtualized networks, including the service level (VPN ID), the IGP network level (IGP MT ID), and the MPLS network level (MPLS MT ID). A service virtual network is an abstracted network, with an actual physical network, that includes nodes and paths selected for forwarding the corresponding service traffic. Using multiple level network abstraction (or virtualization) with multiple IDs for a service or virtual network, e.g., between end-to-end customers, complicates network architecture and switching. There is a need for a scheme that simplifies virtual network abstraction and switching.

SUMMARY OF THE INVENTION

In accordance with an embodiment, a method by a network component for network abstraction using a single network identifier (ID) includes determining, for a service, a virtual network topology including nodes and paths selected within a physical network coupled to end clients, and binding the service to the virtual network topology. The method further includes assigning a virtual network ID to the bounded service and virtual network topology. The virtual network ID defines a single forwarding domain across the physical network corresponding to the virtual network topology. The virtual network ID is then indicated to the nodes of the virtual network topology, thus enabling the nodes to identify and forward traffic for the service between the end clients from edge to edge in the physical network within the single forwarding domain.

In accordance with another embodiment, a method by a network node for forwarding traffic for a service at a single virtual network between end clients includes receiving, from a network controller, a virtual network ID associated with a service and a virtual network topology bounded to the service and including the network node. The virtual network ID defines a single forwarding domain across a physical network coupled to end clients. The virtual network topology extends from edge to edge in the physical network. The method further includes receiving, from the network controller, path information about the virtual network topology, and identifying traffic for the service upon detecting the virtual network ID in the traffic. The traffic is then forwarded, according to the path information, within the single forwarding domain across the virtual network topology.

In accordance with another embodiment, a network controller for network abstraction using a single network ID includes at least one processor and a non-transitory computer readable storage medium storing programming for execution by the at least one processor. The programming including instructions to determine, for a service, a virtual network topology including nodes and paths selected within a physical network coupled to end clients, and bind the service to the virtual network topology. The programming includes further instructions to assign a virtual network ID to the bounded service and virtual network topology. The virtual network ID defines a single forwarding domain across the physical network corresponding to the virtual network topology. The controller is further configured to indicate the virtual network ID to the nodes of the virtual network topology. The virtual network ID enables the nodes to identify and forward traffic for the service between the end clients from edge to edge in the physical network within the single forwarding domain.

In accordance with yet another embodiment, a network node for forwarding traffic for a service at a single virtual network between end clients includes at least one processor and a non-transitory computer readable storage medium storing programming for execution by the at least one processor. The programming includes instructions to receive, from a network controller, a virtual network ID associated with a service and a virtual network topology bounded to the service and including the network node. The virtual network ID defines a single forwarding domain across a physical network coupled to end clients. The virtual network topology extends from edge to edge in the physical network. The programming further includes instructions to receive, from the network controller, path information about the virtual network topology, and identify traffic for the service upon detecting the virtual network ID in the traffic. The network node is further configured to forward the traffic, according to the path information, within the single forwarding domain across the virtual network topology.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein to enable single level network abstraction for a service across one or more domains. The embodiments use a single network ID across a service and any number of domains, e.g., IGP/MPLS/SDN domains, to identify a service and a corresponding virtual network topology. A virtual network topology can be abstracted, e.g., for each VPN service, based on the physical underlying network(s) topology, and assigned a corresponding virtual network ID. Since different services may be assigned similar or same virtual topologies, the virtual network ID represents a VPN service and topology pair. The virtual network topology and ID is determined using a SDN controller (SDNC) that interacts with the physical network and the application layers, as described in detail below.

Figure 1:
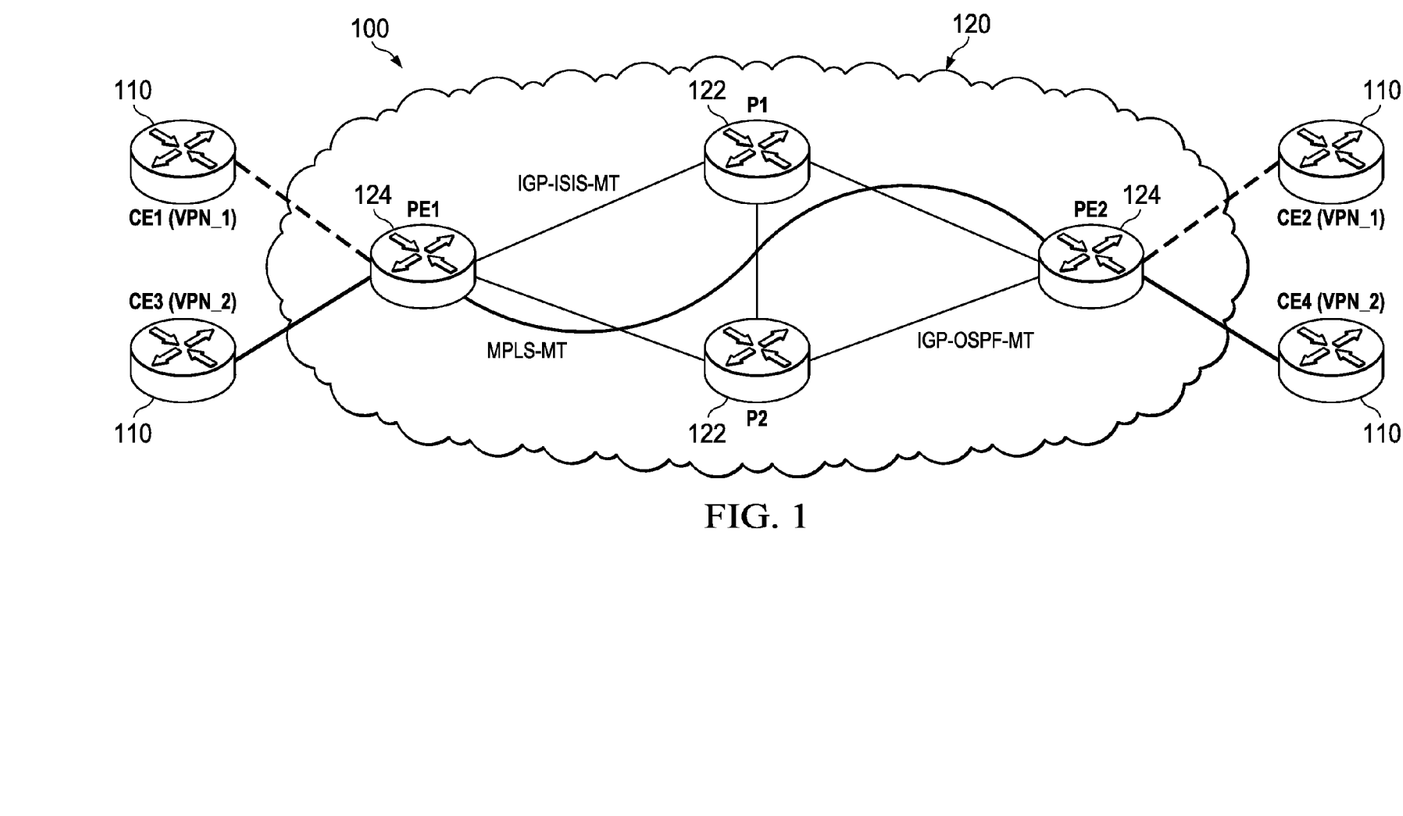
FIG. 1 illustrates an example of multilevel network abstraction using multiple network IDs.

FIG. 1 shows an example of multilevel network abstraction 100 using multiple network IDs. For each service, a service virtual network is established between the end-to-end clients and across a provider network 120. Multiple virtual network IDs (for multiple domains) are assigned for each established service virtual network. For example, a first service virtual network is established between a first client edge 110 (CE1) and a second client edge 110 (CE2), and a second service virtual network is established between a third client edge 110 (CE3) and a fourth client edge 110 (CE4). The service virtual networks are established as VPNs between the client edges 110, for example VPN_1 between C1 and C2 and VPN_2 between C3 and C4. Each service virtual network is also established across multiple domains inside the provider network 120. The domains in the provider network 120 include IGP domains, for example according to Intermediate System to Intermediate System (ISIS) and Open Shortest Path First (OSPF) protocols, and a MPLS domain. The domains comprise paths established between provider network nodes 122 (e.g., P1 and P2) and edge nodes 124 (e.g., PE1 and PE2). As such, the virtual network IDs for the service virtual networks are represented by three levels of virtualized networks: at the service level using a VPN ID), at the IGP network level using an IGP-ISIS-MT ID and an IGP-OSPF-MT ID, and at the MPLS network level using a MPLS-MT ID. Such multilevel network abstraction scheme can complicate implementation and traffic handling for services, including the management of forwarding tables and mappings required, for instance due to the mappings needed between the different IDs for the same virtual network.

Figure 2:
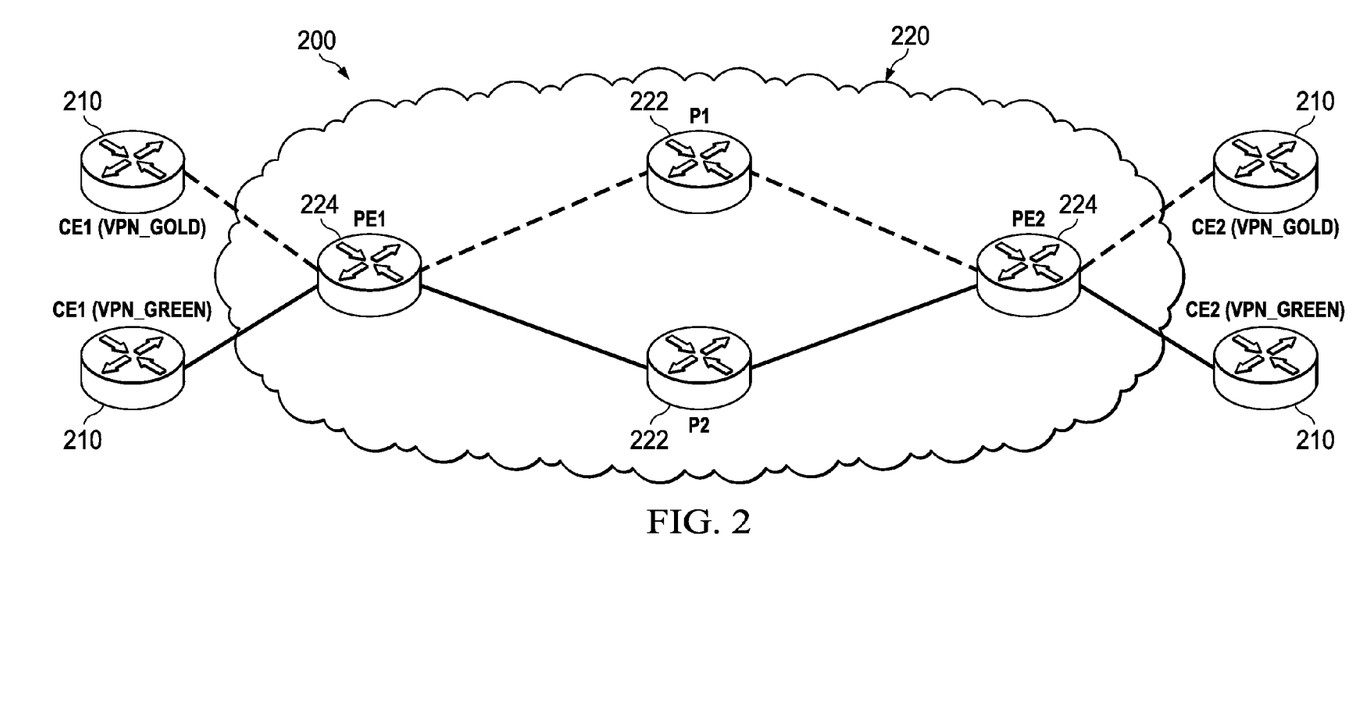
FIG. 2 illustrates an embodiment of a network abstraction using a single network ID.

FIG. 2 shows an embodiment of a network abstraction scheme 200 using a single network ID. The scheme 200 can be implemented using a SDNC. For each service between end-to-end clients, a single network ID is used across the service provider network. Each service virtual network corresponds to a VPN service and a network topology pair. For example, a first service virtual network is established between a first client edge 210 (CE1) and a second client edge 210 (CE2), and a second service virtual network is established between a third client edge 210 (CE3) and a fourth client edge 210 (CE4). The service virtual networks are established as VPNs between the client edges 110, for example VPN_1 between C1 and C2 and VPN_2 between C3 and C4. Each VPN is also established across the provider network 120 including paths between provider network nodes 222 (e.g., P1 and P2) and edge nodes 224 (e.g., PE1 and PE2). As such, each service virtual network or VPN is represented by a single virtual network ID. The single network ID is used to identify the service and topology (abstracted based on the physical topology) to the service. The single ID representation also joins the service and network into a single domain (the SDN domain). This single ID network abstraction scheme can simplify implementation and traffic handling for the services, where the management of forwarding tables and mappings uses a unified ID per end-to-end service across the network.

Figure 3:
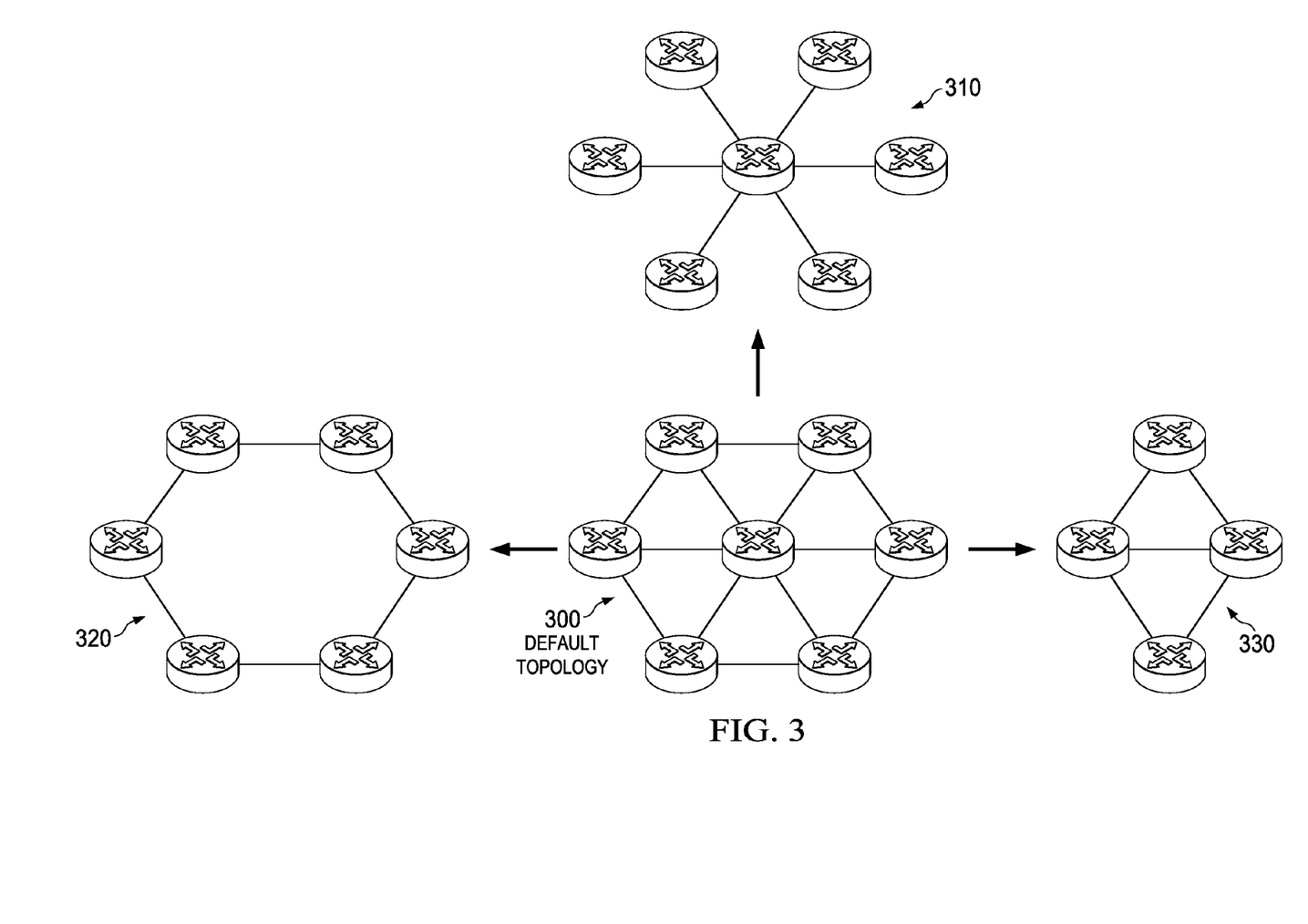
FIG. 3 illustrates an example of abstracting different virtual network topologies.

FIG. 3 shows an example of abstracting different virtual network topologies, e.g., using a SDNC. First, a default topology 300 is abstracted from the physical topology of a network. The default topology comprises selected nodes, including interconnected core and edge nodes. Multiple virtualized topologies can then be built, for instance using static or dynamic mechanisms, based on the default topology 300 and the physical topology. Example of virtual topologies that can be built from the same abstract default topology 300 include a star topology 310, a ring topology 320, and a mesh topology 330. The virtual topologies may include same or different nodes and links from the abstract topology. Each VPN service is then bounded to one suitable topology. A virtual network ID is assigned to the bounded service and topology pair for forwarding traffic of the corresponding service. Multiple VPN services may also be bounded to the same topology using different assigned virtual network IDs.

Figure 4:
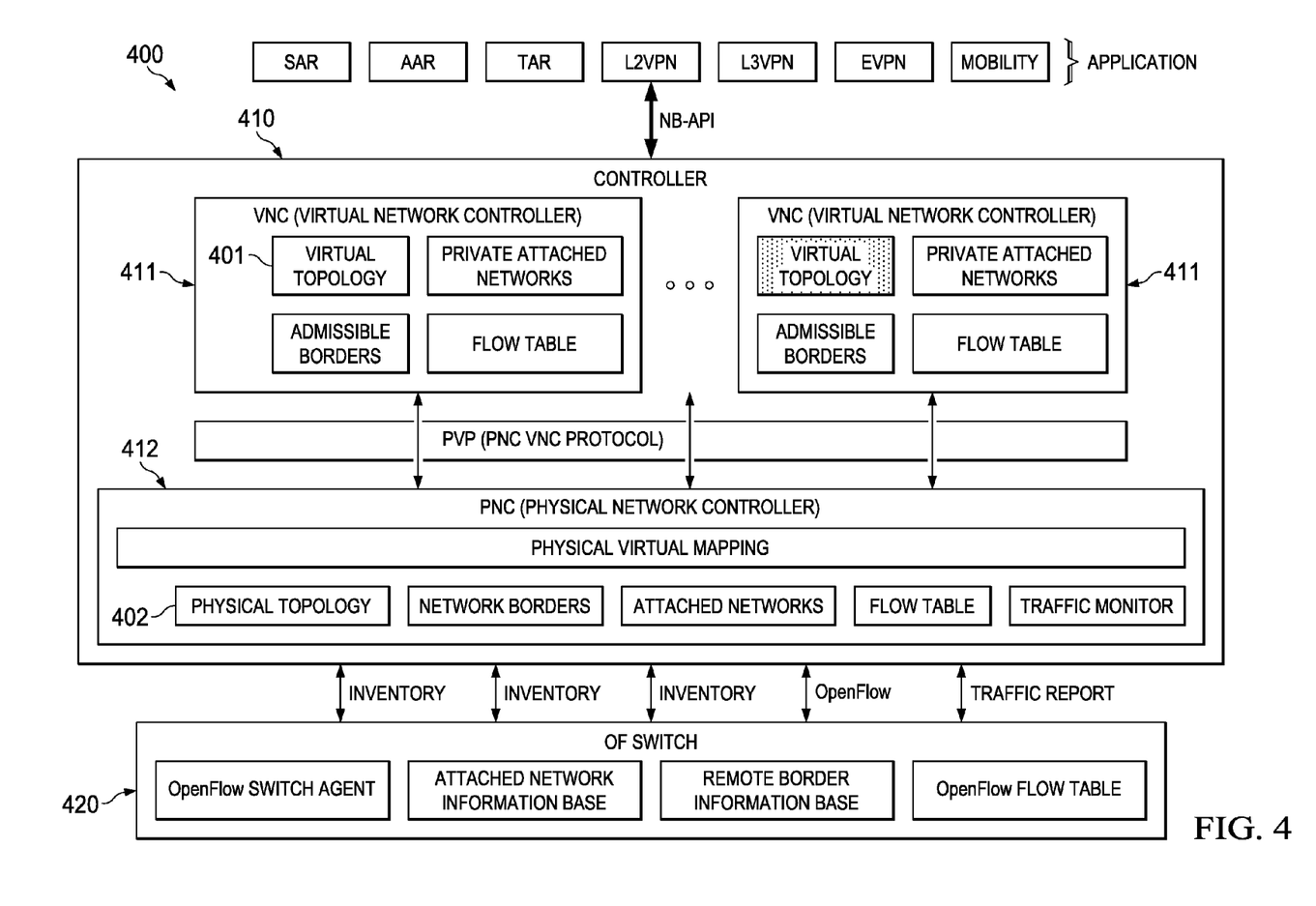
FIG. 4 illustrates an embodiment of a virtual network topology abstraction model using a SDN controller (SDNC)

FIG. 4 shows an embodiment of a virtual network topology abstraction model 400 using a controller 410, e.g., a SDNC. The controller 410 comprises on or more virtual network controllers (VNCs) 411 and a physical network controller (PNC) 412. Multiple VNCs 411 may be used for multiple corresponding virtual topologies. The VNC(s) 411 can interface with the PNC 412 at the controller 410 via a defined PNC-VNC protocol (PVP). A physical topology module 402 in the PNC 412 abstracts the physical topology of a network through the inventory channel between an open-flow (OF) switch 420 and the controller 410. A virtual topology module 401 in the VNC 411 gets the service topology requirement from the service modules, e.g., at a Layer 2 VPN, of the application layer through a North bound application programming interface (NB-API) between the controller 410 and application layer. The virtual topology module 401 in the VNC 411 also gets the physical topology from the PNC 412 through the PVP and a physical virtual mapping (PVM) between the PNC 412 and VNC 411. The controller 410 can then build an end-to-end virtualized network using a static configuration algorithm or a dynamic mechanism based on the obtained abstract physical topology and the service virtual topology. The VNC 411 assigns the virtual network ID, e.g., with VPN information and multiple topology information, to the corresponding service flow.

Figure 5:
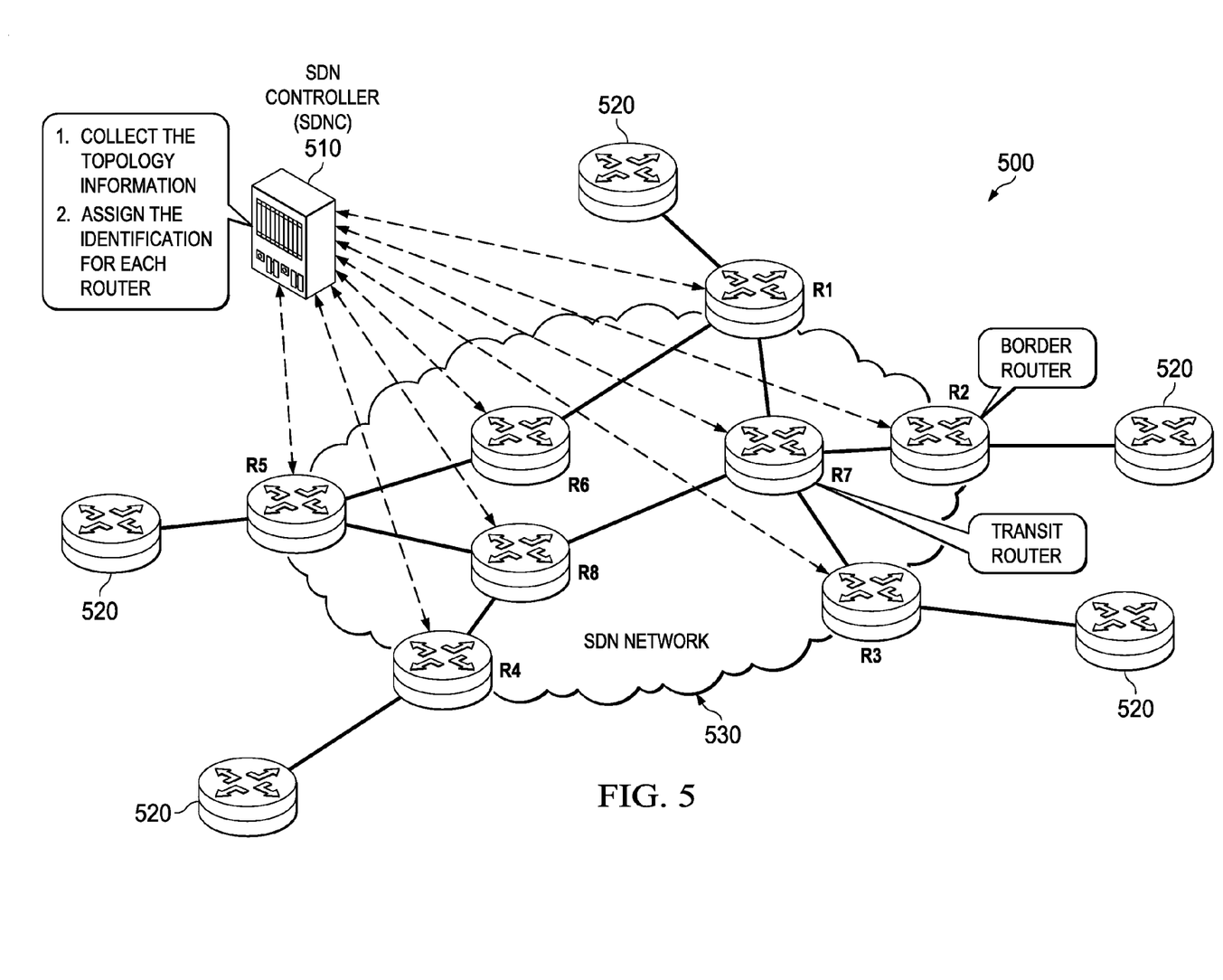
FIG. 5 illustrates an embodiment for collecting topology information by a SDNC.

The VNC 411 collects the routing information for the flow from each border node, e.g., a border router, and the controller 410 installs a forwarding/switching (fwd/sw) table at each router in the virtualized topology. The tables on transit routers are flow ID (FlowID) based switching tables. FIG. 5 shows a scenario 500 for collecting topology information by a SDNC 510 from a network 530. The SDNC 510 may correspond to the controller 410 in the virtual network topology abstraction model 400. The SDNC 500 collects the network topology information from the routers of the network. The terms node and routers are used herein interchangeably to indicate a network component for forwarding traffic, such as routers, switches, bridges, or other similar function nodes. The SDNC 510 also assigns an ID for each of the routers (or nodes). For example, the routers include border routers R1, R2, R3, R4, and R5, and intermediate routers R6, R7, and R8.

Figure 6:
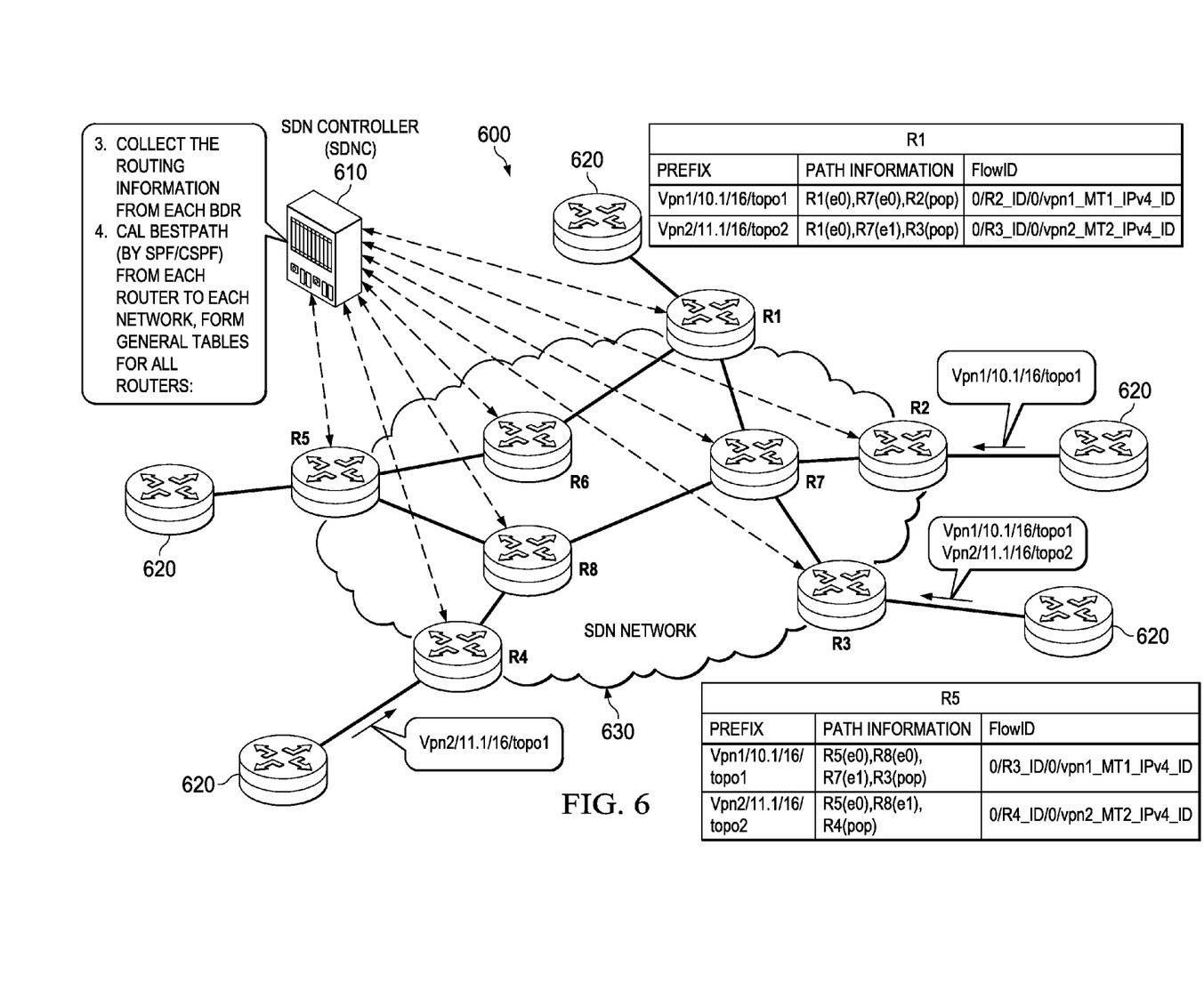
FIG. 6 illustrates an embodiment for determining a path for virtual networks by a SDNC.

FIG. 6 shows a scenario 600 for determining a path for virtual networks by a SDNC 610. The SDNC 610 may correspond to the controller 410 in the virtual network topology abstraction model 400. The SDNC 610 collects the routing information from each border router of the network, as described in the model 400. For example, the border routers are R1, R2, R3, R4, and R5. According to the routing information, the SDNC 610 calculates a best path for each router, e.g., according to the routing information. The best path is calculated using a suitable algorithm, such as Shortest Path First (SPF) or Constrained SPF (CSPF). The SDNC 610 then forms, for each router, a table with routing/path information for each service/topology pair associated with the router. The table includes, for each associated service, a prefix designating the virtual network service (or VPN) and the corresponding topology, path information indicating the routers along the path, and a FlowID indicating the ID of egress router on the path and the assigned virtual network ID. For example, for each of R1 and R5, the tables show the paths and IDs for the pairs VPN1/topology1 and VPN2/topology2.

Figure 7:
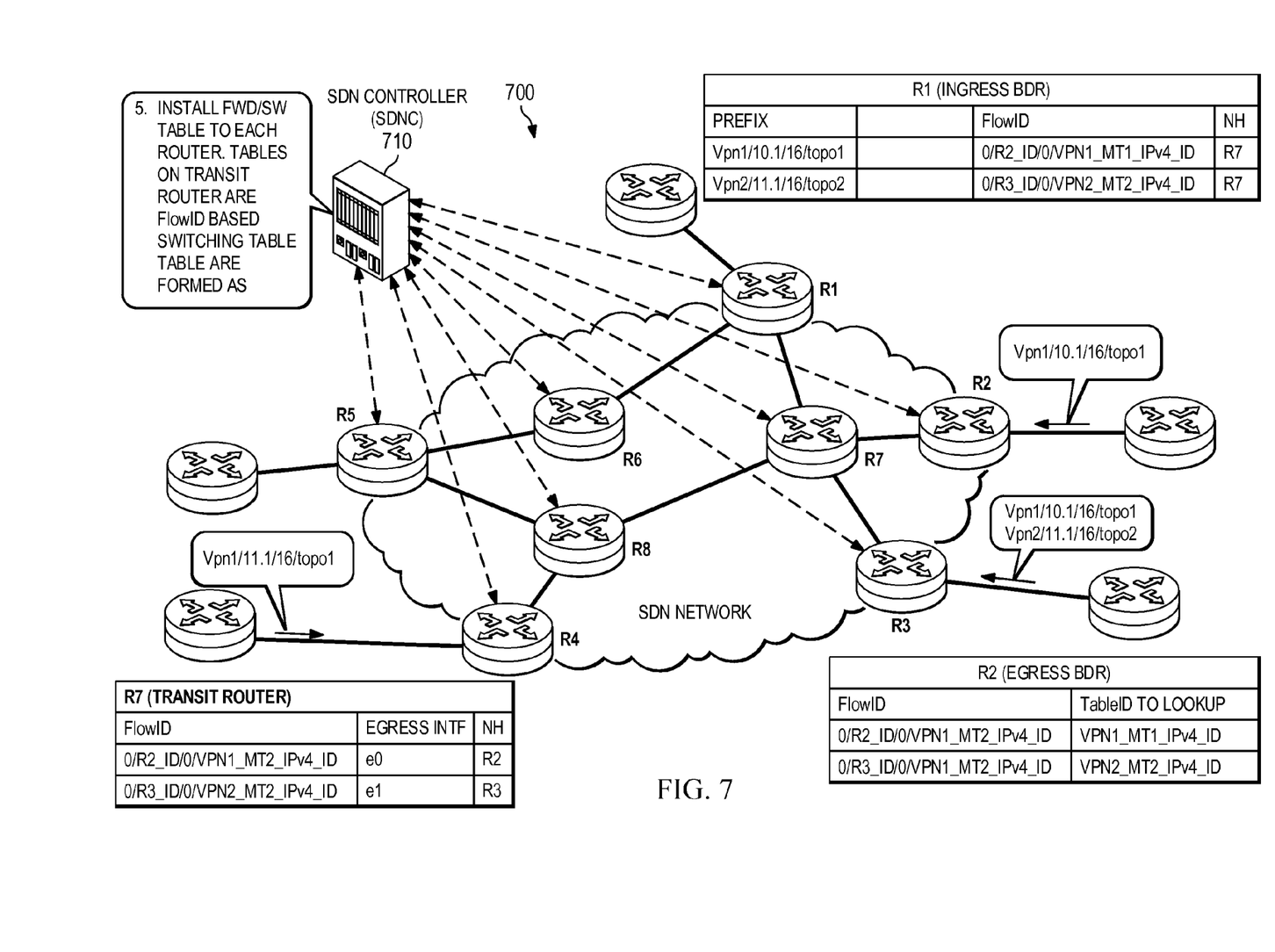
FIG. 7 illustrates an embodiment for installing forwarding/switching tables at network nodes by a SDNC.

FIG. 7 illustrates a scenario 700 for installing forwarding/switching tables at network routers by a SDNC. The SDNC 710 may correspond to the controller 410 in the virtual network topology abstraction model 400. The SDNC 710 installs forwarding/switching (fwd/sw) tables at each of the routers (e.g., routers 1 to 8) belonging to established virtual networks. The table installed on a border router at path ingress indicates the prefixes of all VPN/topology pairs associated with the router, the egress interface or port of the router, a FlowID for each service, and a next hop (NH) on the path. The tables installed on the border routers at path egress indicate the FlowID for each service associated with the router, and a corresponding table ID for look up. The table ID indicates a pair of virtual network ID and topology pair. There may be multiple forwarding/switching tables installed on an ingress or egress router, where each table is indexed by a pair of virtual network ID and topology. When an ingress or egress router receives a package for a specific virtual network and topology, the router uses the table ID to find the corresponding forwarding/switching table to forward the package properly. The tables installed on the transit or intermediate routers, such as R2 and R7, indicate the FlowID, the egress interface, and the NH. The routers in the network detect the virtual network ID in incoming traffic flow and then use their corresponding FlowID based forwarding tables to properly forward the traffic.

Figure 8:
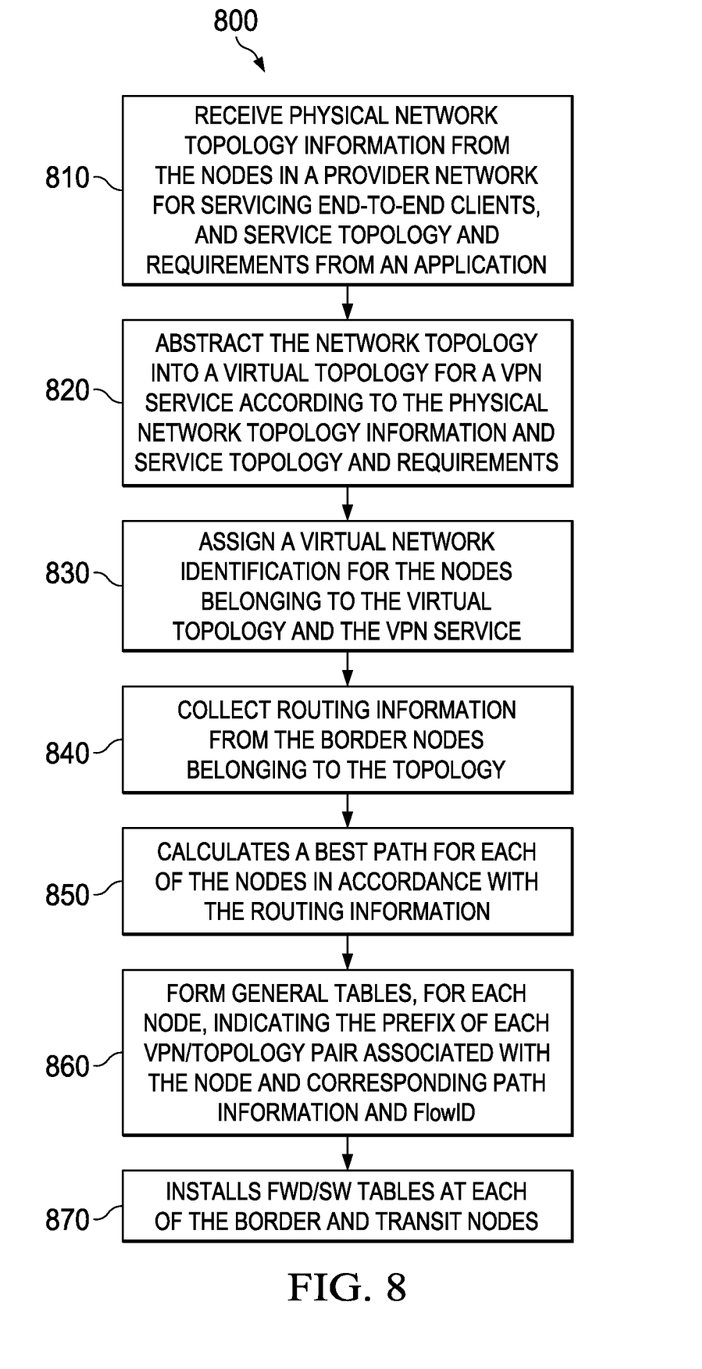
FIG. 8 is a flow diagram of an embodiment of a SDN virtual network abstraction method.

FIG. 8 shows an embodiment of a SDN virtual network abstraction method 800, which may be implemented by a SDNC, such as the controller 410. At step 810, the SDNC receives physical network topology information from the nodes in a provider network for servicing end-to-end clients, and service topology and requirements from an application. At step 820, the network topology is abstracted into a virtual topology for a VPN service according to the physical network topology information and service topology and requirements. At step 830, the SDNC assigns a virtual network ID for the nodes belonging to the virtual topology and the VPN service. At step 840, the SDNC collects routing information from the border nodes belonging to the topology. At step 850, in accordance with the routing information, the SDNC calculates a best path, e.g., using SPF, CSPF or any other suitable algorithm, for each of the nodes. At step 860, the SDNC forms general tables, for each node, indicating the prefix of each service/topology pair associated with the node, and corresponding path information and FlowID. At step 870, the SDNC installs fwd/sw tables at each of the nodes. The border nodes and transit nodes may have different format fwd/sw tables, as described above.

Figure 9:
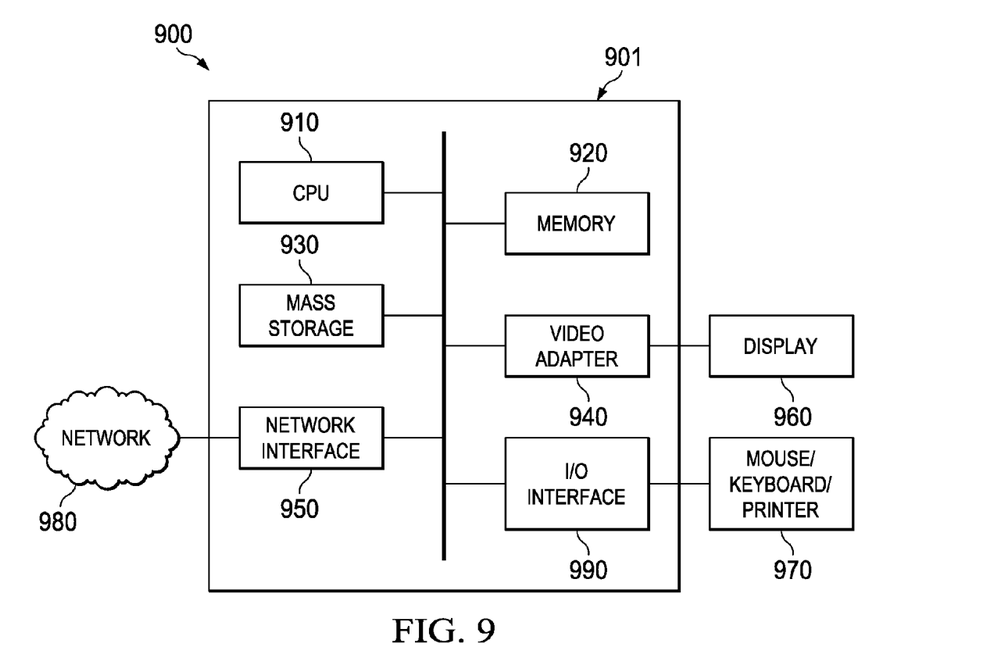
FIG. 9 is a diagram of a processing system that can be used to implement various embodiments.

FIG. 9 is a block diagram of an exemplary processing system 900 that can be used to implement various embodiments. Specific devices may utilize all of the components shown, or only a subset of the components and levels of integration may vary from device to device. For example, the devices include the APs and the STAs of a WLAN or a Wi-Fi system. Furthermore, a device may contain multiple instances of a component, such as multiple processing units, processors, memories, transmitters, receivers, etc. The processing system 900 may comprise a processing unit 901 equipped with one or more input devices, such as a microphone, mouse, touchscreen, keypad, keyboard, and the like. Also, processing system 900 may be equipped with one or more output devices, such as a speaker, a printer, a display, and the like. The processing unit may include central processing unit (CPU) 910, memory 920, mass storage device 930, video adapter 940, and I/O interface 990 connected to a bus 995.

The bus 995 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. The mass storage device 930 may comprise any type of storage device configured to store data, programs, and other information and to make the data, programs, and other information accessible via the bus 995. The mass storage device 930 may comprise, for example, one or more of a solid state drive, hard disk drive, a magnetic disk drive, an optical disk drive, or the like.

The video adaptor 940 and I/O interface 990 provide interfaces to couple external input and output devices to the processing unit. As illustrated, examples of input and output devices include the display 960 coupled to the video adapter 940 and the mouse/keyboard/printer 970 coupled to the I/O interface 990. Other devices may be coupled to the processing unit 901, and additional or fewer interface cards may be utilized. For example, a serial interface card (not shown) may be used to provide a serial interface for a printer.

The processing unit 901 also includes one or more network interfaces 950, which may comprise wired links, such as an Ethernet cable or the like, and/or wireless links to access nodes or different networks. The network interface 950 allows the processing unit 901 to communicate with remote units via one or more networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   determining, by a network component for a service, a virtual network topology corresponding to a virtual network established for the service, the virtual network topology including nodes and paths selected within a physical network, the physical network being coupled to end clients and providing different domains for establishing virtual networks for the service, wherein traffic for the service is forwarded according to the virtual network topology between the end clients from edge to edge of the physical network, and wherein the nodes comprise at least one intermediate node that is not an edge node;
   binding, by the network component, the service to the virtual network topology;
   determining, by the network component, a virtual network identifier (ID) in accordance with an application layer of the service;
   assigning, by the network component, the virtual network ID to the bound service and virtual network topology, the virtual network ID being a single value identifying both the service and the virtual network topology as a pair to each node included in the virtual network topology regardless in which of the different domains the virtual network is established, wherein the virtual network ID identifies the virtual network topology and the bound service across the physical network in the application layer;
   assigning, by the network component, the virtual network ID identifying both the service and the virtual network topology as a pair to each of the nodes of the virtual network topology for the service; and
   associating, by the network component for each of the nodes of the virtual network topology and by using the virtual network ID, the service and the virtual network topology as a pair with a forwarding path that is determined for a corresponding node, so that each of the nodes identifies the traffic for the service and forwards the traffic for the service within the virtual network topology that is bound with the service using only the virtual network ID, wherein the forwarding path determined for the corresponding node indicates all nodes of the physical network along the forwarding path that are to be used for forwarding the traffic for the service from the corresponding node to an end client.

2. The method of claim 1 further comprising:
   receiving physical network topology information from the physical network;
   receiving service topology information and requirement from the application layer of the service; and
   determining the virtual network topology in accordance with the physical network topology information and the service topology information and requirement.

3. The method of claim 1 further comprising:
   collecting routing information from border nodes among the nodes of the virtual network topology; and
   calculating paths for the nodes in accordance with the routing information.

4. The method of claim 3 further comprising:
   assigning for each node of the nodes a respective ID;
   generating, for the service, a flow ID indicating the virtual network ID and the respective ID for a path egress node; and
   generating, for the service, a prefix designating the service and the virtual network topology.

5. The method of claim 4 further comprising installing a forwarding table at each border node at an ingress of a path of the virtual network topology, wherein the forwarding table includes the prefix, an egress interface of the border node, the flow ID, and a next hop (NH) on the path.

6. The method of claim 4 further comprising installing a forwarding table at each border node at an egress of a path of the virtual network topology, wherein the forwarding table includes the flow ID, and the virtual network ID to lookup another forwarding table.

7. The method of claim 4 further comprising installing a forwarding table at each intermediate node, wherein the forwarding table includes the flow ID, an egress interface of the intermediate node, and a next hop (NH) on a path.

8. The method of claim 1 further comprising:
   determining, for a second service, a second virtual network topology coupled to end clients for the second service;
   binding the second service to the second virtual network topology;

assigning a second virtual network ID to the bound second service and second virtual network topology; and indicating the second virtual network ID to a plurality of nodes of the second virtual network topology, wherein the second virtual network ID enables the nodes to identify and forward traffic for the second service between the end clients within the second virtual network topology.

9. The method of claim 1 further comprising:

binding a second service to the virtual network topology;

assigning a second virtual network ID to the bound second service and virtual network topology; and indicating the second virtual network ID to the nodes of the virtual network topology, wherein the second virtual network ID enables each of the nodes to identify and forward traffic for the second service between the end clients within the virtual network topology.

10. A method comprising:

receiving, by a network node from a network controller, a virtual network identifier (ID) associated with a service and a virtual network topology bound to the service, the virtual network topology corresponding to a virtual network established for the service between end clients and having a plurality of network nodes including the network node that are selected within a physical network, the physical network being coupled to the end clients and providing different domains for establishing virtual networks for the service, the plurality of network nodes comprising at least one intermediate node that is not an edge node, and the virtual network ID being a single value identifying both the service and the virtual network topology as a pair to each of the plurality of network nodes in the virtual network topology regardless in which of the different domains the virtual network is established, wherein the virtual network ID is assigned to each of the plurality of network nodes and is used to associate, for each of the plurality of network nodes, the service and the virtual network topology as a pair with a forwarding path that is determined for a corresponding network node, so that each of the plurality of network nodes identifies and forwards traffic for the service in the virtual network topology using only the virtual network ID, wherein the forwarding path determined for the corresponding network node indicates all nodes of the physical network along the forwarding path that are to be used for forwarding the traffic for the service from the corresponding network node to an end client, and wherein the virtual network topology extends from edge to edge in the physical network;

receiving, by the network node from the network controller, path information about a forwarding path determined for the network node within the virtual network topology, the path information is associated with the service and the virtual network topology as a pair by the virtual network ID;

identifying, by the network node, the traffic for the service by detecting the virtual network ID in the traffic; and forwarding the traffic, by the network node according to the received path information, within the virtual network topology, using only the virtual network ID to identify the forwarding path.

11. The method of claim 10 further comprising sending routing information to the network controller.

12. The method of claim 10 further comprising receiving, from the network controller, a respective ID assigned to the network node in the virtual network topology.

13. The method of claim 10 further comprising receiving a forwarding table including a prefix designating the service and the virtual network topology, an egress interface of the network node, a flow ID indicating the virtual network ID and a respective ID for an egress node on a path of the virtual network topology, and a next hop (NH) on the path, wherein the network node is an ingress border node on the path.

14. The method of claim 10 further comprising receiving a forwarding table including a flow ID indicating the virtual network ID and a respective ID for an egress node on a path of the virtual network topology, and including the virtual network ID to lookup another forwarding table, wherein the network node is an egress border node on the path.

15. The method of claim 10 further comprising receiving a forwarding table including an egress interface of the network node, a flow ID indicating the virtual network ID and a respective ID for an egress node on a path of the virtual network topology, and a next hop (NH) on the path, wherein the network node is an intermediate node on the path.

16. The method of claim 10 further comprising:

receiving, for the network controller, a second virtual network ID associated with a second service and a second virtual network topology bound to the second service, wherein the second virtual network topology extends from edge to edge in the physical network and is coupled to end clients;

receiving, from the network controller, path information about the second virtual network topology;

identifying traffic for the second service upon detecting the second virtual network ID in the traffic; and forwarding the traffic, according to the path information, between the end clients within the second virtual network topology.

17. The method of claim 10 further comprising:

receiving, for the network controller, a second virtual network ID associated with a second service bound to the virtual network topology;

identifying traffic for the second service upon detecting the second virtual network ID in the traffic; and forwarding the traffic for the second service exclusively within the virtual network topology.

18. A network controller comprising:

at least one processor; and a non-transitory computer readable storage medium storing programming for execution by the at least one processor, the programming including instructions to:

determine, for a service, a virtual network topology corresponding to a virtual network established for the service, the virtual network topology including nodes and paths selected within a physical network that is coupled to end clients and provides different domains for establishing virtual networks for the service, wherein traffic for the service is forwarded according to the virtual network topology between the end clients from edge to edge of the physical network, and wherein the nodes comprise at least one intermediate node that is not on the edge of the physical network;

bind the service to the virtual network topology;

determine a virtual network identifier (ID) in accordance with an application layer of the service;

assign the virtual network ID to the bound service and virtual network topology, the virtual network ID being a single value identifying both the service and the virtual network topology as a pair to each node included in the virtual network topology regardless in which of the different domains the virtual network is established, wherein the virtual network ID identifies the virtual network topology and the bound service across the physical network in the application layer; and assign the virtual network ID identifying both the service and the virtual network topology as a pair to each of the nodes of the virtual network topology; and associate, for each of the nodes of the virtual network topology and by using the virtual network ID, the service and the virtual network topology as a pair with a forwarding path that is determined for a corresponding node, so that each of the nodes identifies and forwards the traffic for the service within the virtual network topology using only the virtual network ID, wherein the forwarding path determined for the corresponding node indicates all nodes of the physical network along the forwarding path that are to be used for forwarding the traffic for the service from the corresponding node to an end client.

19. The network controller of claim 18, wherein the virtual network topology includes internal nodes in the physical network, boundary nodes coupled at edges of the physical network to the end clients, and paths selected in the physical network.

20. The network controller of claim 18, wherein the programming includes further instructions to:
receive physical network topology information from the physical network;
receive service topology information and requirement from an application layer of the service; and
determine the virtual network topology in accordance with the physical network topology information and the service topology information and requirement.

21. The network controller of claim 18, wherein the programming includes further instructions to:
collect routing information from border nodes among the nodes of the virtual network topology; and
calculate the paths for the nodes in accordance with the routing information.

22. The network controller of claim 18, wherein the programming includes further instructions to:
assign for each node of the nodes a respective ID;
generate, for the service, a flow ID indicating the virtual network ID and the respective ID for a path egress node;
generate, for the service, a prefix designating the service and the virtual network topology; and
install flow ID based forwarding tables at the nodes including the flow ID for the service.

23. A network node comprising:
at least one processor; and
a non-transitory computer readable storage medium storing programming for execution by the at least one processor, the programming including instructions to:
receive, from a network controller, a virtual network identifier (ID) associated with a service and a virtual network topology bound to the service, the virtual network topology corresponding to a virtual network established for the service between end clients and having a plurality of network nodes including the network node that are selected within a physical network, the physical network being coupled to the end clients and providing different domains usable for establishing virtual networks for the service, the plurality of network nodes comprising at least one intermediate node that is not an edge node, and the virtual network ID being a single value identifying both the service and the virtual network topology as a pair to each of the plurality of network nodes in the virtual network topology regardless in which of the different domains the virtual network is established, wherein the virtual network ID is assigned to each of the plurality of network nodes and is used to associate, for each of the plurality of network nodes, the service and the virtual network topology as a pair with a forwarding path that is determined for a corresponding network node, so that each of the plurality of network nodes identifies and forwards traffic for the service in the virtual network topology based only on the virtual network ID, wherein the forwarding path determined for the corresponding network node indicates all nodes of the physical network along the forwarding path that are to be used for forwarding the traffic for the service from the corresponding network node to an end client, and wherein the virtual network topology extends from edge to edge in the physical network;

receive, from the network controller, path information about a forwarding path determined for the network node in the virtual network topology, the path information being associated with the service and the virtual network topology as a pair by the virtual network ID;

identify the traffic for the service upon detecting the virtual network ID in the traffic; and forward the traffic according to the received path information within the virtual network topology using only the virtual network ID to identify the forwarding path.

24. The network node of claim 23, wherein the network node is an ingress border node on a path of the virtual network topology, and wherein the programming includes further instructions to receive a flow ID based forwarding table including a prefix designating the service and the virtual network topology, an egress interface of the network node, a flow ID indicating the virtual network ID and a respective ID for an egress node on the path, and a next hop (NH) on the path.

25. The network node of claim 23, wherein the network node is an egress border node on a path of the virtual network topology, and wherein the programming includes further instructions to receiving a flow ID based forwarding table including a flow ID indicating the virtual network ID and a respective ID for an egress node on the path, and further including the virtual network ID to lookup another forwarding table.

26. The network node of claim 23, wherein the network node is an intermediate node on a path of the virtual network topology, and wherein the programming includes further instructions to receive a flow ID based forwarding table including an egress interface of the network node, a flow ID indicating the virtual network ID and a respective ID for an egress node on the path, and a next hop (NH) on the path.

* * * * *